United States Patent [19]

Schlaegel

[11] Patent Number: 5,027,544
[45] Date of Patent: Jul. 2, 1991

[54] FISHING DEVICE

[76] Inventor: Gene A. Schlaegel, 1810 Winston Dr., Iowa City, Iowa 52240

[21] Appl. No.: 435,349

[22] Filed: Nov. 13, 1989

Related U.S. Application Data

[63] Continuation-in-part of Ser. No. 372,620, Jun. 28, 1989, Pat. No. 4,910,907.

[51] Int. Cl.⁵ ............................................. A01K 83/06
[52] U.S. Cl. ................................................... 43/44.6
[58] Field of Search ...................... 43/42.5, 44.4, 44.6, 43/44.2, 42.29, 42.52, 44.8

[56]     References Cited
    U.S. PATENT DOCUMENTS

| 643,573 | 2/1900 | Votaw et al. | 43/44.6 |
|---|---|---|---|
| 2,010,598 | 8/1935 | Leighton | 43/30 |
| 2,012,786 | 8/1935 | Hoage | 43/44.4 |
| 2,157,333 | 5/1939 | Hadaway | 43/40 |
| 2,158,794 | 5/1939 | Eppel | 43/44.4 |
| 2,501,753 | 3/1950 | Ayers | 43/42.43 |
| 2,582,646 | 1/1952 | Moore | 43/44.2 |
| 2,892,280 | 5/1959 | Davis | 43/42.5 |
| 2,894,351 | 7/1959 | Doane | 43/44.6 |
| 2,939,241 | 6/1960 | Hicks | 43/42.5 |
| 3,293,799 | 12/1966 | Konomos | 43/44.2 |
| 3,457,666 | 7/1969 | Klinkhamer | 43/41 |
| 3,645,031 | 2/1972 | Egles | 43/44.2 |
| 4,010,568 | 3/1977 | Mays | 43/44.4 |
| 4,067,135 | 1/1978 | Martin | 43/43.14 |
| 4,189,860 | 2/1980 | Ebert | 43/42.29 |
| 4,796,376 | 1/1989 | Schlaegel | 43/42.29 |

Primary Examiner—Kurt Rowan
Assistant Examiner—James Miner
Attorney, Agent, or Firm—Morton S. Adler

[57]     ABSTRACT

A bait harness for holding a bait in the form of a fish or fillet for casting, trolling or jigging is designed to be virtually weedless in use. The harness includes a clamp of highly resilient spring material bent so that integral opposed sides converge to an abutting normally closed position for gripping the jaws of a bait fish and include a movable arms means for selectively opening the sides. In one embodiment, the clamp is secured to a buoyant artificial fishing plug provided with a removable fastening means for securing the tail portion of the fish bait to the shank of the hook. In a second embodiment, the clamp carries a pair of multi-barbed hooks connected respectively to the clamp sides for disposition at opposite sides of the bait. In a third embodiment, the clamp is secured to a spoon provided with a trailing single hook, and the forward end of the spoon is extended forwardly, upwardly and rearwardly to present a leading curled end terminating in a small lip that is connected by a rubber band to the barbed end of the single hook and thus enhances its weedless capability. In a fourth embodiment, the clamp is secured to a lead head jig.

13 Claims, 2 Drawing Sheets

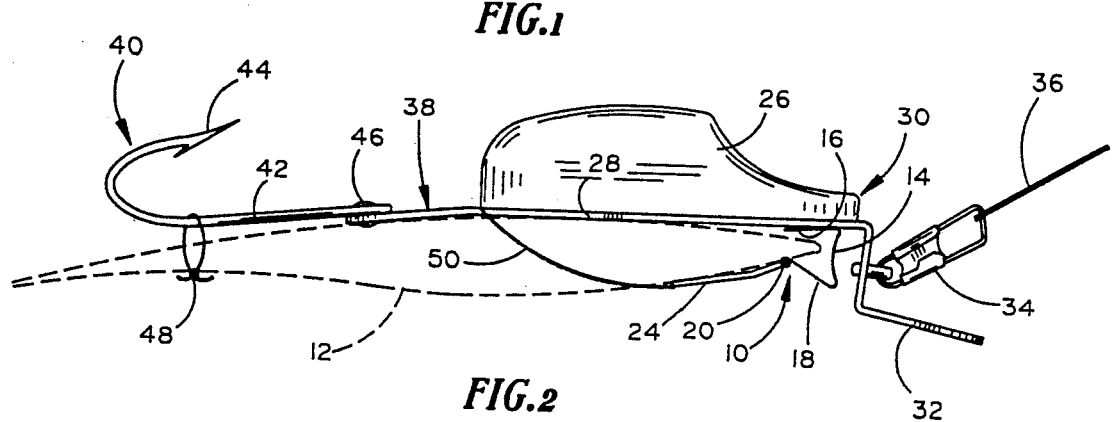
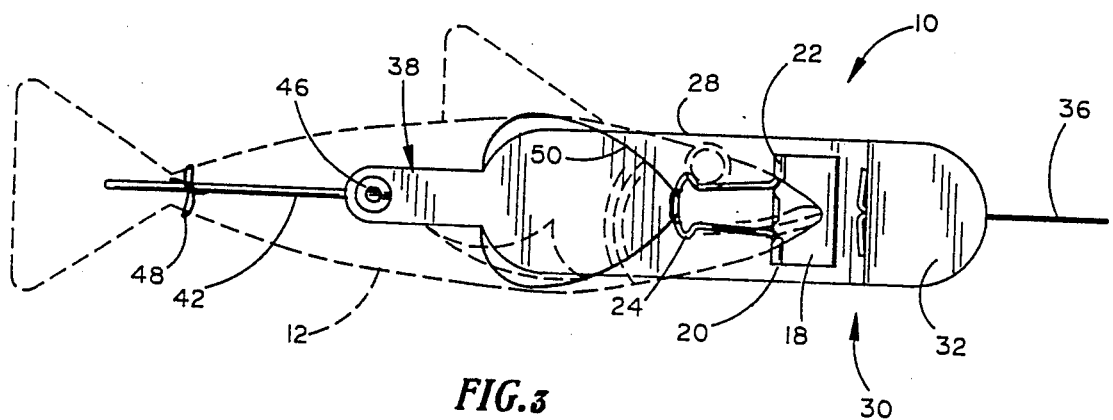
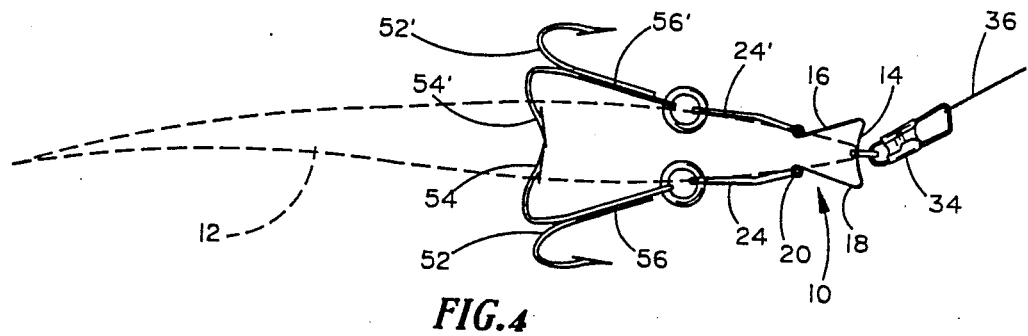
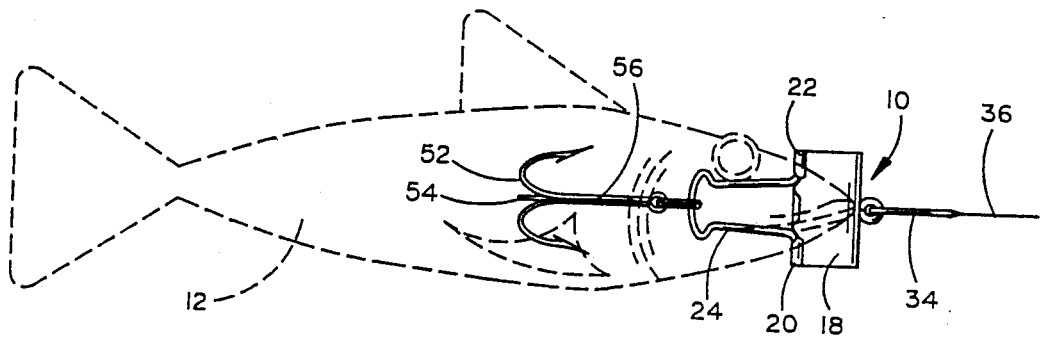

FISHING DEVICE

BACKGROUND OF THE INVENTION

This invention relates to fishing devices and is a continuation-in-part of my pending application, Ser. No. 07/372,620 filed June 28, 1989, now U.S. Pat. No. 4,910,907, and discloses further improvements to my U.S. Pat. No. 4,796,376 referred to in said application. Harnesses for bait fish have long been used in a variety of forms and shapes as exemplified in U.S. Pat. Nos. 4,189,860, 3,293,790, 2,582,646, 3,457,666 as well as in my patent referred to above and one of the important objects of this invention is to provide improvements in construction, design and versatility of use of such a harness as compared with those presently in use.

Other objects herein are to provide a harness as characterized that has a minimum of parts for economy in manufacture, is simple and easy to use and is extremely efficient for its intended purpose.

A further object is to provide a device of the above class that is adapted for use with bait fish of varying sizes.

More particularly, it is an object of this invention to provide a harness for a bait fish that includes a clamp of highly resilient spring material bent so that integral opposed sides converge to a normal abutting closed position for gripping the jaws of a bait fish or the leading end of a fillet and include a movable arm means for selectively opening said sides.

Another object herein is to provide a harness as characterized that is adapted for use with various respective fishing paraphernalia such as artificial fishing plugs, spoons, single, double and treble hooks, lead head jigs and the like whereby a fisherman can practice different fishing techniques as the situation may present.

Still another object is to provide a fishing device of the above class which is of a weedless design to materially reduce and substantially eliminate the likelihood of loss of bait or its snagging when pulled through weeds and other obstructions.

SUMMARY

In accordance with this invention, a bait harness for holding a bait in the form of a fish or fillet for casting, trolling or jigging is designed to be virtually weedless in use for avoiding the loss or snagging of the bait when pulled through weeds or other obstructions. The harness includes a clamp of highly resilient spring material bent so that integral opposed sides converge to an abutting normally closed position for gripping the jaws of a bait fish or the leading end of a fillet and include a movable arm means for selectively opening said sides. In one embodiment, the clamp is secured to a buoyant artificial fishing plug provided with a trailing single hook, riding up, and a removable fastening means for securing the tail portion of the fish bait to the shank of the hook. In a second embodiment, the clamp carries a pair of multi-barbed hooks connected respectively to the clamp sides for disposition at opposite sides of the bait and, preferably, one bar on each hook is bent perpendicularly to the shank of the hook so that it can be selectively imbedded into respective opposite sides of the bait. In a third, embodiment, the clamp is secured to a spoon provided with a trailing single hook, riding up, for insertion through the tail of the bait fish and the forward end of the spoon is extend forwardly, upwardly and rearwardly to present a leading curled end terminating in a small lip that is connected by a rubber band to the barbed end of the single hook and thus enhances its weedless capability. In a fourth embodiment, the clamp is secured to a lead head jig provided with a trailing single hook, riding up, for insertion through the bait, and a fish hook, preferably with multiple barbed points having one of said points inserted through the tail of the bait, is secured by a flexible line to the clamp.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

In each figure herein, it is noted that a bait fish is shown in broken lines for purpose of illustrating the use of the device shown and such description is incorporated by reference for each figure below to avoid repetition of language.

FIG. 1 is a side elevational view of this harness shown in use with a buoyant artificial plug having a trailing single hook, riding up, FIG. 2 is a bottom plan view of the device in FIG. 1, FIG. 3 is a side elevational view of a second embodiment of this harness shown in use with a pair of multi-barbed hooks of which respective barbs are imbedded in respective opposite sides of the bait.

FIG. 4 is a bottom plan view of the device in FIG. 3 and for which a top plan view would be the same.

DESCRIPTION OF THE PREFERRED EMBODIMENTS

Figure 5:
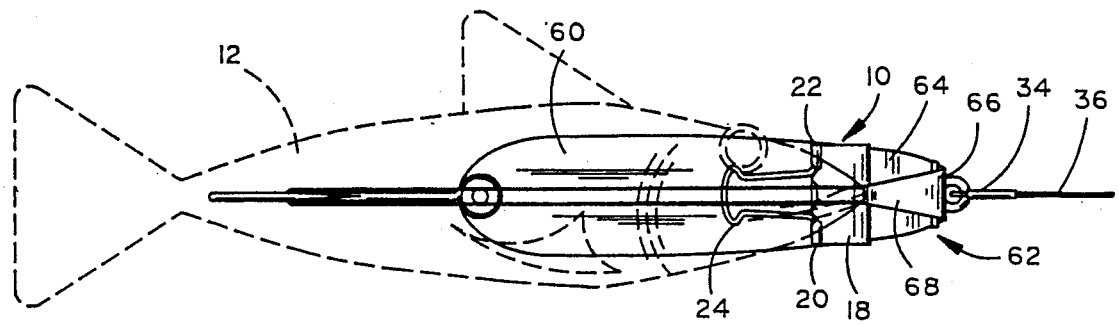
FIG. 5 is a top plan view of a third embodiment of this harness shown in use with a spoon having my newly designed curled leading end and provided with a trailing single hook, riding up, for piercing the tail portion of the bait.

Referring to the drawings wherein like parts in the several embodiments of the fishing harness to be described are given like numerals, the basic component is an extremely strong spring clamp 10 used to tightly grip the jaws of the bait fish 12 as shown or to grip the leading edge of a fillet (not shown) should that be used in place of the bait 12. Clamp 10 is a modification of what is generally referred to as a binder clip described in my pending application referred to above.

Clamp 10 comprises a body of highly resilient spring material bent to define a closed end 14 with integral sides 16, 18 converging so that their free ends are normally biased to abutting closed position but, as shown in the respective drawings, are opened sufficiently for gripping engagement with the jaws of bait 12. The outer end portions on the outer surface of side 18 on clamp 10 are bent up and around to form the respective collars 20, 22. An elongated generally U-shaped arm 24 for opening sides 18, 20 as will appear has each free end bent perpendicularly outward to form respective stub shafts that are pivotally journalled in the respective collars 20, 22 (FIGS. 2,4,5,7) whereby arm 24 is movable into and out of engagement with side 18. On the embodiment shown in FIGS. 3,4, a second like arm 24' is similarly secured to side 16 for engagement therewith as will appear.

With reference to FIGS. 1,2, I show the use of clamp 10 with a buoyant artificial fishing plug 26 mounted on an enlongated base plate 28 that at its leading end 30 extends downwardly and forwardly to form the projecting apertured lip 32 in a form and arrangement that is well known. Side 16 of clamp 10 is secured to the underside of the leading end 30 of plate 28 and, as seen in FIG. 1, clamp 10 securely grips the jaws of bait 12. Clamp 10 is opened for engaging such jaws by rotating arm 24 into pressing engagement with side 18 sufficiently to separate sides 18, 16. Arm 24 is then moved to a position in juxtaposition with bait 12 where it poses no obstacle when being pulled through weeds or other obstacles. Lip 32 is adapted to receive a clip 34 and line 36.

The trailing end of plate 28 projects from plug 26 as at 38 and a single fish hook 40 comprising an elongated shank 42 and integral barbed hook point 44 is secured by a rivet or the like 46 at the free end of shank 42 to end 38 of plate 28 in a trailing relationship to plug 26 with point 44 in a riding up position as seen in FIG. 1. Preferably, though not necessary, the tail portion of bait 12 is secured to shank 42 by any suitable removable fastening means for which I have used a twistable tie 48 of a type in common use and I have also preferably placed a rubber band 50 connected to the closed end of arm 24 around the bait 12 behind plug 26 to aid in preventing the accidental displacement of arm 24 from its position shown in FIG. 1 when this device is pulled through weeds and the like. End 38 of plate 28 is bendable so that, if desired, it can be bent downwardly to enhance the wobble and side to side action of plug 26. It has been demonstrated in use that with point 44 of hook 40 in the riding up position shown, and aided by the buoyancy of plug 26, it does not ordinarily snag when pulled through weeds and this is a decided advantage when fishing for Muskellunge, Northern Pike and Bass that frequent weeded areas.

In a second embodiment of this device as seen in FIGS. 3,4, side 16 of clamp 10 is provided with a movable arm 24' of like construction and arrangement as arm 24 on side 18 previously described so that in this embodiment, clamp 10 is opened by pressing both arms 24, 24' against the respective sides 18, 16 to grip the jaws of bait 12 and thereafter, arms 24, 24' are positioned as best seen in FIG. 3. A clip 34 and line 36 are attached to clamp 10 as shown. Respective multi-barbed hooks 52, 52' are secured to the respective closed ends of arms 24, 24' and preferably, I have bent one of the barbed points 54, 54' on each hook to a perpendicular relationship to its respective shank 56, 56' for the purpose of being imbedded into the respective opposite sides of bait 12. This aids in securing the bait 12 and is particularly useful with live bait.

Figure 6:
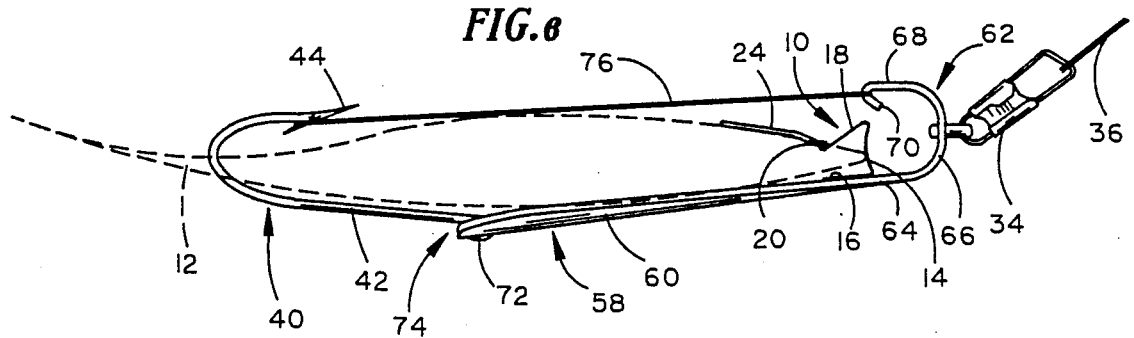
FIG. 6 is a side elevational view of the device in FIG. 5.

In a third embodiment of this device shown in FIGS. 5,6, clamp 10 is used with a conventional type spoon 58 that I have modified and improved to enhance its capability as a weedless lure. For this purpose, the conventional spoon body 60 has been provided with a leading curled end 62 formed by extending the leading edge of body 60 forwardly as at 64, then upwardly 66 and then rearwardly 68 to terminate in the angular lip 70. Clamp 10 is secured to the innerside of the leading end of body 60 in spaced relationship below lip 70 as shown. A single hook of the type disclosed in FIG. 1 at 40 with a shank 42 and barbed point 44 is secured by a rivet or the like 72 at the free end of shank 42 to the trailing end 74 of spoon body 60 and extends rearwardly with point 44 in a riding up position to penetrate the tail portion of bait 12. In this position, point 44 is forwardly oriented above the bait 12 and, to enhance the weedless capability of this embodiment, point 44 and lip 70 can be connected by a rubber band 76 in a well known manner. The improved curled end 62 is particularly effective in preventing entanglement of clamp 10 and bait 12 with weeds and the like.

Figure 7:
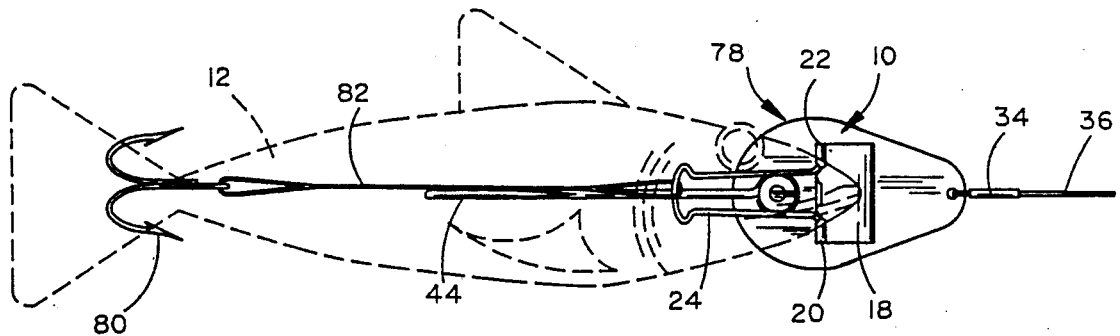
FIG. 7 is a top plan view of a fourth embodiment of this harness shown in use with a lead head jig having a trailing single hook, riding up, and a hook attached to the harness and piercing the tail portion of the bait.
Figure 8:
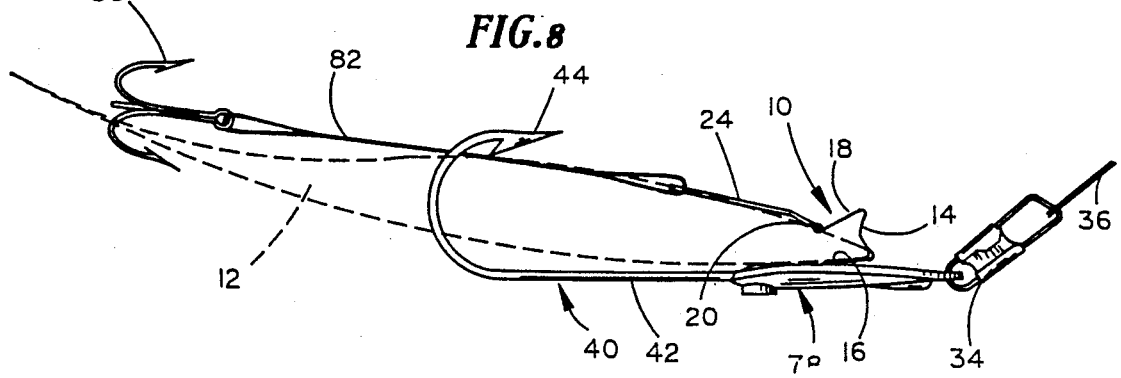
FIG. 8 is a side elevational view of the device in FIG. 7.

In a fourth and last embodiment disclosed for this invention herein, FIGS. 7,8, I have combined clamp 10 with a lead head jig 78 in a manner in which such jigs, that are widely used in myriads of forms, have not heretofore been employed. Conventionally, such jigs with a fishing line on its leading end are in a spaced lead position relative to a bait which is engaged by a trailing hook on the jig and if more hooking capacity is desired, a freely movable stinger hook is attached by a flexible line to the hook holding the bait. This has the disadvantage of the bait being torn off the hook when pulled through weeded areas. To overcome this disadvantage, I have secured side 16 of the clamp 10 to the innerside of jig 78 in a similar manner as with plug 26 (FIG. 1) and spoon 58 (FIG. 6) for which like numerals are given to like parts. A multi-barbed hook 80 referred to as a stinger hook when used with jig 78 can, if desired, be engaged with the tail of the bait 12 and connected by a flexible line 82 to the closed end of arm 24 as shown. By this arrangement, the likelihood of the bait 12 tearing off with jig 78 is avoided. Such stinger hooks 80 are not always used, however, and in the conventional form where they are secured to the hook, their removal is often difficult. I have also overcome this disadvantage by making the stinger hook 80 easily and quickly removable. For this purpose, hook 80 is attached by line 82 to the closed end of arm 24 which can be easily removed from clamp 10 by pressing the parallel lengths of arm 24 towards each other to release their respective stub shafts from collars 20, 22 once clamp 10 has been engaged with the bait 12. Accordingly, in view of the foregoing, it is thought a full understanding of the construction and operation of the several embodiments of this invention will be had and the advantages of the same will be appreciated.

I claim:

1. A harness for securing a fishing bait for casting, trolling or jigging, consisting of:
    a clamp of highly resilient spring material bent to form converging sides having opposed ends biased to a normal abutting closed position for tightly gripping said bait,
    an elongated arm pivotally mounted at one end to one end of one side of said clamp and movable into pressure engagement with said side to open said clamp with release of pressure effecting the closing of said clamp by spring tension,
    an artificial fishing lure defining a leading end to receive a fishing line and a trailing end to receive a fish hook secured to the other side of said clamp,
    said artificial fishing lure being a spoon, and
    the leading end of said spoon extended forwardly, upwardly and rearwardly to define a curled leading end for moving through weeded areas free of entanglement therewith.

2. A harness as defined in claim 1 including said arm being movable to a position in juxtaposition with a gripped fishing bait so it can be pulled through weeds without becoming entangled therewith.

3. A harness as defined in claim 2 including a flexible member connected to said arm and encircling said fishing bait to hold said arm against accidental displacement from juxtaposition therewith.

4. A harness as defined in claim 1 including a single barbed point fishing hook having an elongated shank secured to and projecting from the trailing end of said artificial fishing lure.

5. A harness as defined in claim 4 wherein said hook is disposed so that said barbed point is in a riding up position for facilitating passage through weeded areas.

6. A harness as defined in claim 5 including removable fastening means for securing said shank to said fishing bait.

7. A harness as defined in claim 5 including said hook being disposed to penetrate a portion of said fishing bait.

8. A harness as defined in claim 1, including:
said fishing bait being a fish, and
said clamp being adapted to grip the jaws thereof.

9. A fishing device, consisting of:
an elongated spoon artificial fishing lure defining a lead-end to receive a fishing line and a trailing end to receive a fish hook,
a clamp of highly resilient spring material bent to form converging sides having opposed ends biased to a normal abutting closed position secured to said leading end and adapted to tightly grip a fishing bait,
an elongated arm pivotally mounted at one end to one end of one side of said clamp and movable into pressure engagement with said side to open said clamp with release of pressure effecting the closing of said clamp by spring tension, and
a single barbed point fishing hook having an elongated shank secured to and projecting from the trailing end of said spoon.

10. A fishing device as defined in claim 9, including;
said fishing bait being a fish, and
said clamp being adapted to grip the jaws thereof.

11. A fishing device as defined in claim 9 including said hook being disposed so that said barbed point is in a riding up position and penetrating a portion of said fishing bait.

12. A harness for securing a fishing bait for casting, trolling or jigging, consisting of:
a clamp of highly resilient spring material bent to form converging sides having opposed ends biased to a normal abutting closed position for tightly gripping said bait,
an elongated arm pivotally mounted at one end to one end of one side of said clamp and movable into pressure engagement with said side to open said clamp with release of pressure effecting the closing of said clamp by spring tension,
an artificial fishing lure defining a leading end to receive a fishing line and a trailing end to receive a fish hook secured to the other side of said clamp,
said artificial fishing lure being a lead head jig,
a single barbed point fishing hook having an elongated shank secured to and projecting from the trailing end of said lead head jig, and
said hook being disposed so that said barbed point is in a riding up position and penetrating an intermediate portion of said fishing bait.

13. A harness as defined in claim 12, including:
a fish hook engaged through an end portion of said fishing bait,
a flexible line connecting said hook to said arm, and
said arm being removably attached to said clamp whereby removal of said arm from said clamp affords selective use of said lead head jig with and without said fish hook.

* * * * *